United States Patent [19]

Fisher

[11] Patent Number: 4,593,163
[45] Date of Patent: Jun. 3, 1986

[54] ELECTRIC MOTORS AND METHOD OF MANUFACTURING AND OPERATING SAME

[75] Inventor: Lynn E. Fisher, Fort Wayne, Ind.
[73] Assignee: General Electric Company, Fort Wayne, Ind.
[21] Appl. No.: 522,620
[22] Filed: Aug. 12, 1983
[51] Int. Cl.$^4$ .................. H01H 35/10; H01H 1/00
[52] U.S. Cl. ............................................. 200/80 R
[58] Field of Search ............... 200/19 A, 30 A, 31 A, 200/38 B, 38 C, 80 R, 80 B, 283

[56] References Cited

U.S. PATENT DOCUMENTS

| | | | |
|---|---|---|---|
| 1,857,202 | 5/1932 | Lee | 200/80 R X |
| 2,556,675 | 6/1951 | Carnagua | 200/80 R X |
| 2,616,682 | 11/1952 | Greenhut | 264/18 |
| 2,768,260 | 10/1956 | Greenhut | 200/80 |
| 2,777,912 | 1/1957 | Haines, Jr. | 200/80 R |
| 2,811,656 | 10/1957 | Mollenberg | 310/60 |
| 3,315,139 | 4/1967 | Wharton | 200/80 R |
| 3,575,562 | 4/1971 | Remke | 200/80 |
| 3,582,741 | 6/1971 | Arnold et al. | 318/209 |
| 4,315,118 | 2/1982 | Kramer et al. | 200/80 R |
| 4,386,290 | 5/1983 | Monette | 310/68 |

*Primary Examiner*—J. R. Scott
*Attorney, Agent, or Firm*—Ralph E. Krisher, Jr.

[57] ABSTRACT

Motor has outboard switch compartment with components therein such as a capacitor, thermal protector, terminal board, motor circuit controlling switch assembly, a manual switch, a thermal plastic molded cover for the compartment fastened with axially directed screws, and an optional rain shroud positively positioned on the end shield. The switch assembly is designed to have accurate contact alignment which will be maintained over the life of the switch; a wiping action of the contacts; a high amount of contact travel in terms of percentage of switch actuator travel; protected contact blade arms; and a multiple height mounting feature which assures a more optimum location of the switch at final assembly with respect to the location of the switch operating mechanism. Switch arms are essentially parallel and have contacts positioned directly in line with the actuating line of a switch actuator and an operating mechanism. A switch arm support is a molded synthetic material housing which, with a synthetic material molded switch actuator, provide precise and accurate preloading of the contact arms. Non-stick actuator features are included. Also included is a novel cover attaching approach and method, as well as switch assembly variable height mounting structure means and methods.

12 Claims, 33 Drawing Figures

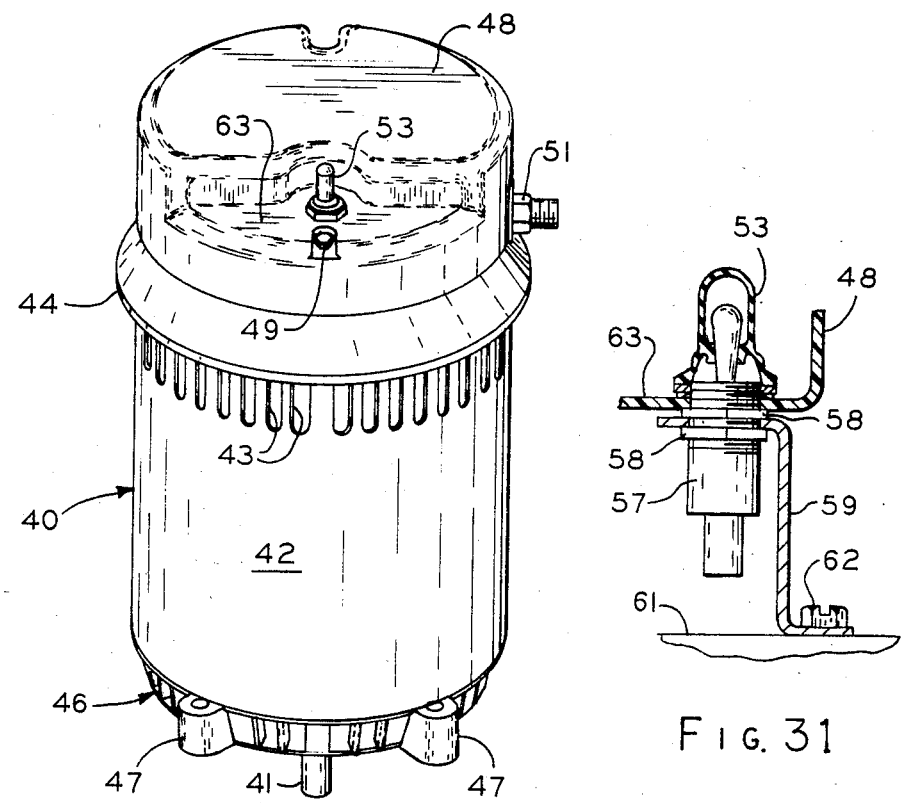
FIG. 1
FIG. 31
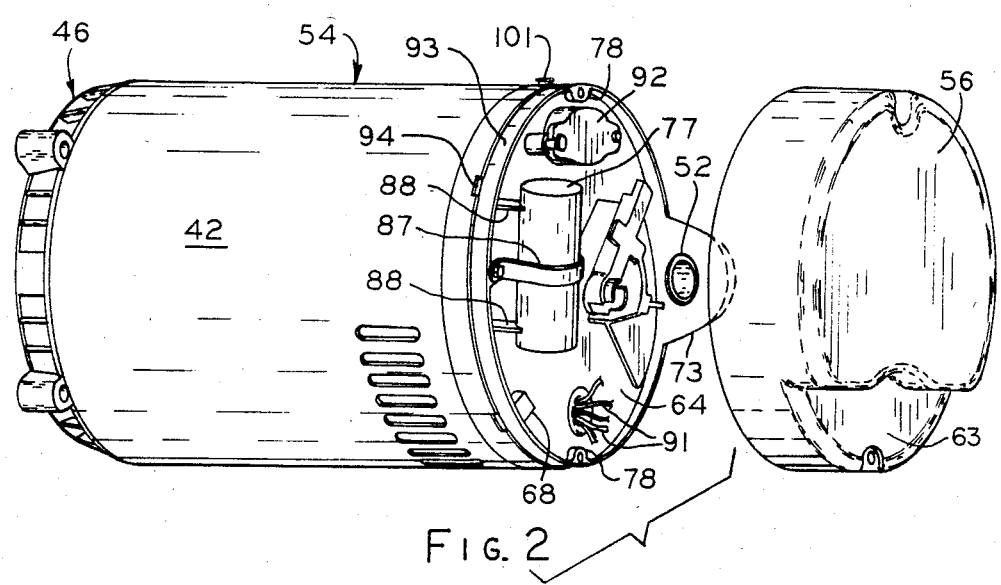
FIG. 2

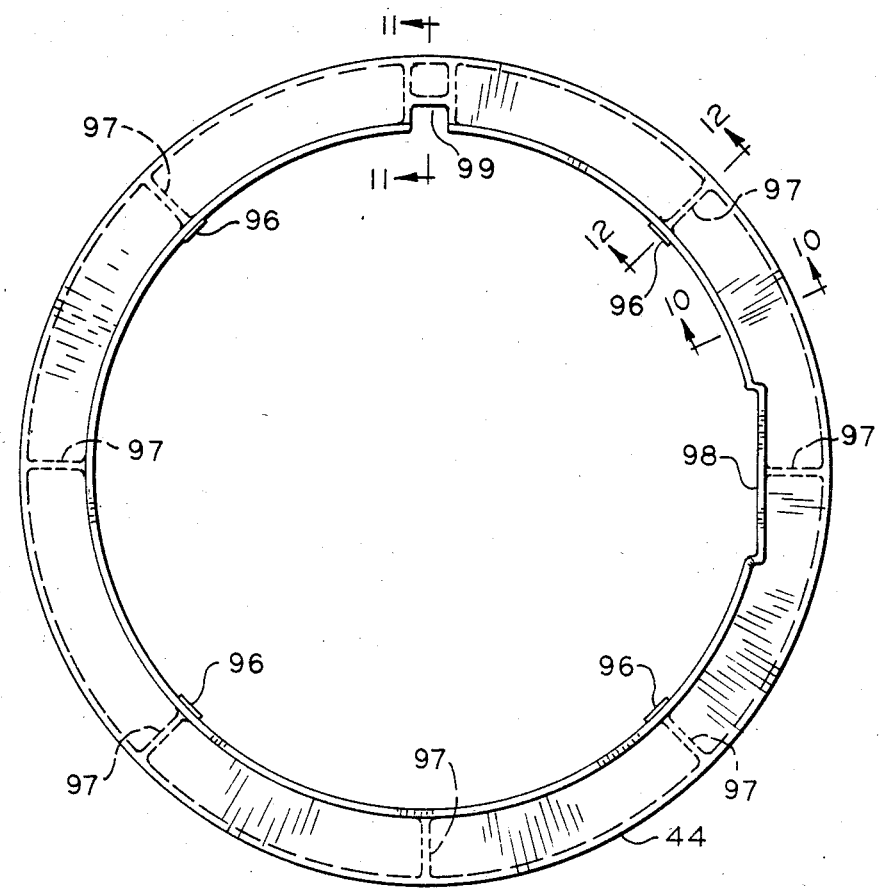
FIG_9
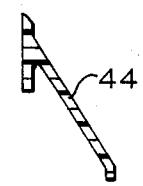
FIG_10
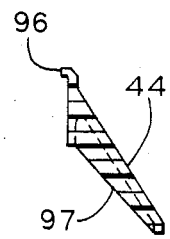
FIG_12
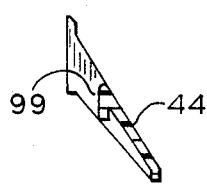
FIG_11
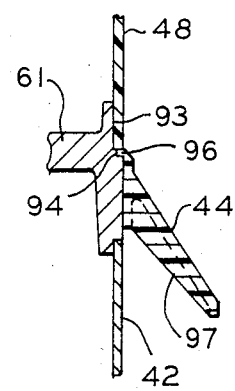
FIG_13

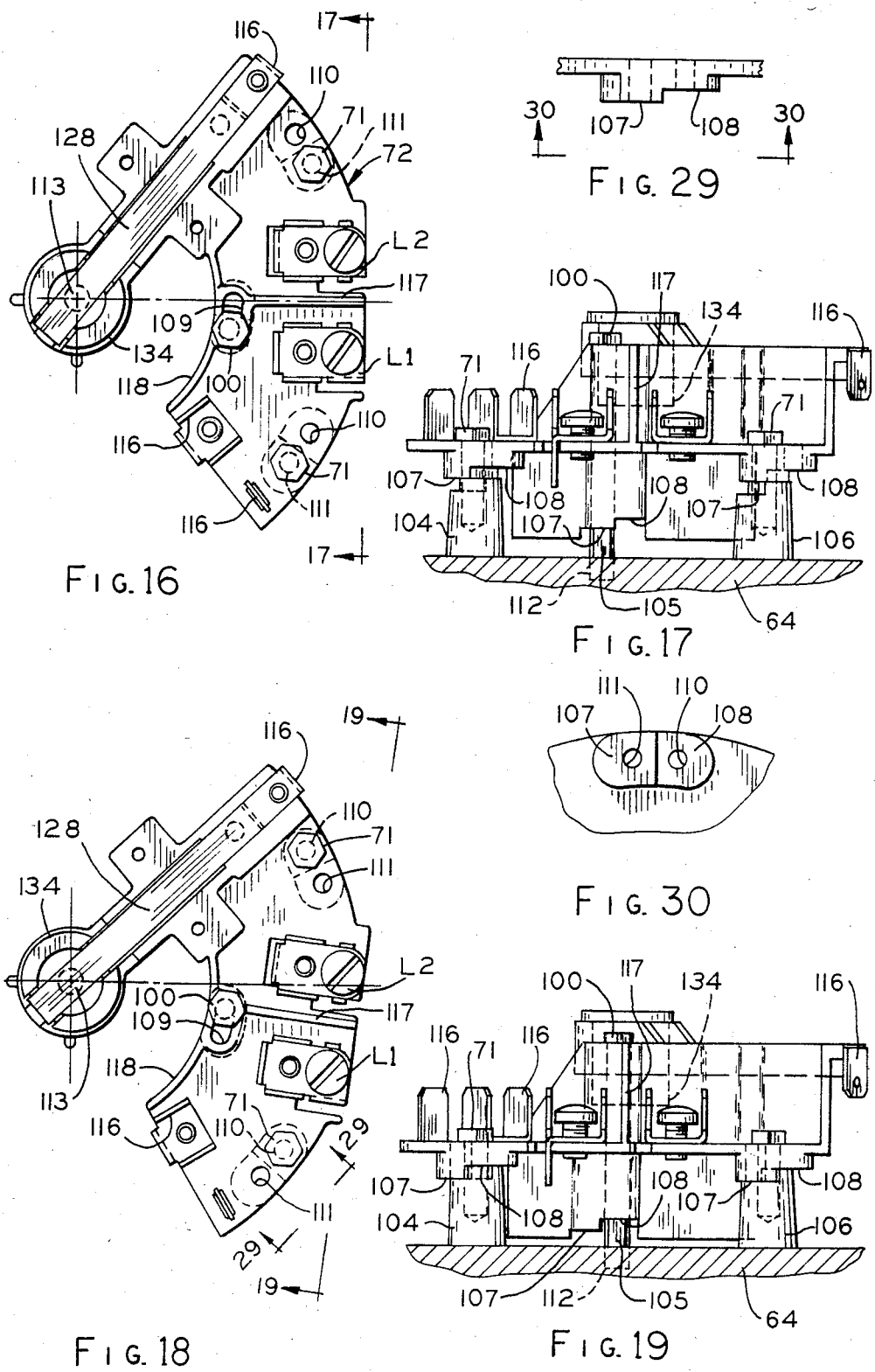

ELECTRIC MOTORS AND METHOD OF MANUFACTURING AND OPERATING SAME

BACKGROUND OF THE INVENTION

The present invention relates generally to electric motors, and, more particularly, to motors of the type wherein the energization of motor windings are controlled by switch mechanisms carried on the motor which are actuated by axially movable switch actuating members; to motors of the type that are to be exposed to moisture such as, for example, moisture conditions encountered in outdoor environments; to motors having what are known in the art as outboard switch or accessory device compartments; and to motors wherein it is desirable to provide a motor-carried, externally-accessible switch for determining the operational mode or condition of such motor.

As will be understood by persons of ordinary skill in the art, single phase induction motors may be of many different types. Thus, there are resistance start, reactor start, capacitor start, permanent split capacitor, and capacitor start-capacitor run motors, to name but a few. These different types of motors are characterized by different speed-torque characteristics, and of course are capable of being designed to have different theoretical maximum efficiencies. For many applications, and especially those where high starting torque is required, it is necessary for part of the windings in the motor to be designed and arranged to be an auxiliary or starting winding which is energized during initial excitation of the motor but which is de-energized as the motor comes up to a predetermined speed.

One particular reference work that describes motor characteristics and gives specific application information regarding different motors is the C. G. Veinott book entitled, "Fractional and Subfractional Horsepower Electric Motors", published by the McGraw-Hill Book Company. For more information on this subject, the reader is directed, for example, to the third edition of the Veinott book which was copyrighted in 1970 by McGraw-Hill.

In many applications, it is known to use a centrifugally or otherwise actuated switch assembly for de-energizing the auxiliary or starting winding as the motor comes up to speed, and it is desirable to optimize such assemblies in terms of material content, assembly cost, and reliability. Some problems with some switch assembly designs that have been used heretofore, are believed to have been associated with a condition wherein the switch contacts have been "open" to their environment and subject to damage, or to lodging of foreign material on or about such contacts. Another continuing concern for all types of motor circuit controlling switches is the question of accessibility or serviceability of such switches, as well as the cost associated with replacing such switches. It thus also would be desirable to provide a new and improved switch of non-complex design which is reliable in operation.

In switches of the type here contemplated, the long term maintenance of desired dimensional relationships of different switch parts and components is important, in order that desired switch action characteristics result, such as: good contact wiping action; contact self-cleaning action; controlled and limited lost motion relative travel of two or more switch parts; reliable switch action notwithstanding dimensional tolerance accummulations; collinear relationship of contacts and actuator line of travel; weld breaking action; and near-parallel relationship of two contacts.

Accordingly, one of the objects of the present invention is to provide a new and improved switch which is simple in design, is capable of simple installation to provide good contact wiping action, self-cleaning characteristics, and which does not require adjustment over the life of the switch.

Another object of the invention is to provide a new and improved motor circuit controlling switch having limited and controlled lost motion travel between the switch actuator and a switch contact itself, and improved control of the switching action.

Still another object of the present invention is to provide a new and improved switch wherein such switch may be readily mounted to provide an optimum switching action notwithstanding an accummulation of dimensional tolerances of other motor parts.

Other objects of the present invention are to provide a switch assembly wherein: switch contact faces can act in essentially a parallel condition; switch contacts are positioned in close proximity to the switch mechanism actuating line; spring return forces are applied on actuator driven mechanisms to limit upset reactions and switch sticking; switch contact alignment is positively established and maintained; wherein provisions are made for a weld breaking action during movement of the switch arms; potential for sticking as a result of dirt and dust is reduced; and switch blades or arms and contacts are encased in order to provide protection for such elements.

In some applications, and especially those applications of motors used to drive pumps such as jet pumps or swimming pool pumps, circuit controlling switches are mounted outboard of one of the motor end frames to facilitate access thereto. In many pump applications, there may be concern regarding moisture, and it is desirable, e.g., in vertical applications, to provide rain shrouds to prevent rain from entering motor ventilation openings. It thus is another object of the present invention to provide a new and improved rain shroud arrangement which is a single piece which can be interfitted in a positive manner with other parts of a motor and yet wherein the rain shroud itself does not cause water to be trapped inside the outboard switch compartment. It is also an object of the invention to provide a new and improved cover for an outboard switch compartment, as well as means for ensuring drainage of moisture from within such compartment when the motor is positioned for horizontal shaft applications.

Also in some applications, one of which may be, e.g., a swimming pool pump application, it is desirable to have a manually selectable two speed motor. An object of the present invention is to provide a motor having an outboard switch compartment arranged to accommodate therein a manually selectable switch, a capacitor, a thermal protector, and a starting switch.

SUMMARY OF THE INVENTION

In carrying out the above and other objects of the invention, in one preferred form thereof, I provide a new and improved motor having an outboard switch compartment with a number of components arranged and disposed therein. Such components may include, for example, a starting capacitor, a thermal protector, a terminal board and motor circuit controlling switch assembly (e.g., a starting switch assembly), and a manually actuable switch. In a preferred form, a starting switch assembly is utilized which includes not only a switch assembly per se but also a terminal board and wherein the motor circuit controlling switch may be adapted to control either a single speed or two speed motor.

In accordance with other aspects of the invention, I provide a thermal plastic molded cover for the outboard switch compartment which preferably is fastened to the motor with axially directed mounting screws.

In accordance with still other features of the present invention, I have provided a new and improved thermal plastic rain guard or shroud which may be assembled with a slip fit over an end shield and captured by the switch compartment cover. Preferably, means are utilized to positively position the rain shroud on the end shield.

In accordance with still other inventive features, a new and improved switching mechanism is provided which is designed for a high level of quality and reliability by having accurate contact alignment which will be maintained over the life of the switch; a wiping action of the contacts; a high amount of contact travel in terms of percentage of switch actuator travel; protected contact blade arms; and a multiple height mounting feature which assures a more optimum location of the switch at final assembly with respect to the location of the switch operating mechanism.

Switches embodying inventive features include essentially parallel, i.e., overlying switch arms having contacts thereon positioned directly in line with the actuating line of a switch actuator. Moreover, at least two of such switch arms are carried by a switch arm support that preferably is in the form of a molded synthetic material housing which both protects such arms and maintains the parallel alignment of such arms. A synthetic material molded switch actuator and molded switch arm mounting structure provide precise and accurate preloading of the contact arms while at least one of the contact arms in turn cooperates to ensure that a molded switch actuator is urged toward a switch operating mechanism when the motor is stopped. Still other preferred features include means built into the switch assembly to control the contact gap and provide weld breaking action, means for guiding an actuator relative to the actuator support that also minimize potential for sticking and binding; and means for variable level or height mounting of a switch assembly.

The subject matter which I regard as my invention is set forth in the appended claims. The invention itself, however, together with further objects and advantages thereof may be better understood by referring to the following more detailed description taken in conjunction with the drawings.

BRIEF DESCRIPTION OF THE DRAWINGS

FIG. 1 is a perspective view of a vertically arranged motor embodying the present invention in one preferred form thereof;

FIG. 2 is a perspective view, with parts removed, of a horizontally disposed motor embodying other features of the present invention;

FIG. 9 is a plan view of the rain shroud shown in assembled relationship with the motor in FIG. 1;

FIG. 10 is a cross-sectional view taken in the direction of arrows 10—10 in FIG. 9;

FIG. 11 is a cross-sectional view taken in the direction of arrows 11—11 in FIG. 9;

FIG. 12 is a cross-sectional view taken in the direction of arrows 12—12 in FIG. 9;

FIG. 13 is a detail showing the assembled relationship of the rain shroud of FIG. 9, the compartment cover best shown in FIG. 1; the motor shell, and the motor end shield which accommodates the rain shroud;

FIG. 16 is a detailed view of the switch and terminal board shown in FIG. 15;

FIG. 17 is a view taken in the direction of arrows 17—17 in FIG. 16;

FIG. 18 is a view substantially similar to FIG. 16 except that it illustrates a modified mounting position (i.e., height) of the switch and terminal board with respect to mounting posts on the end frame;

FIG. 19 is a view taken in the direction of arrows 19—19 in FIG. 18;

FIG. 29 is a view taken in the direction of arrows 29—29 in FIG. 18 and providing a typical representation of the multiple mounting surface technique used in switch assemblies illustrated in FIGS. 16 and 23;

FIG. 30 is a view taken in the direction of arrows 30—30 in FIG. 29;

FIG. 31 is an enlarged view illustrating the mounting of a manually selectable switch in motors embodying the present invention;

DESCRIPTION OF THE PREFERRED EMBODIMENTS

Figure 3:
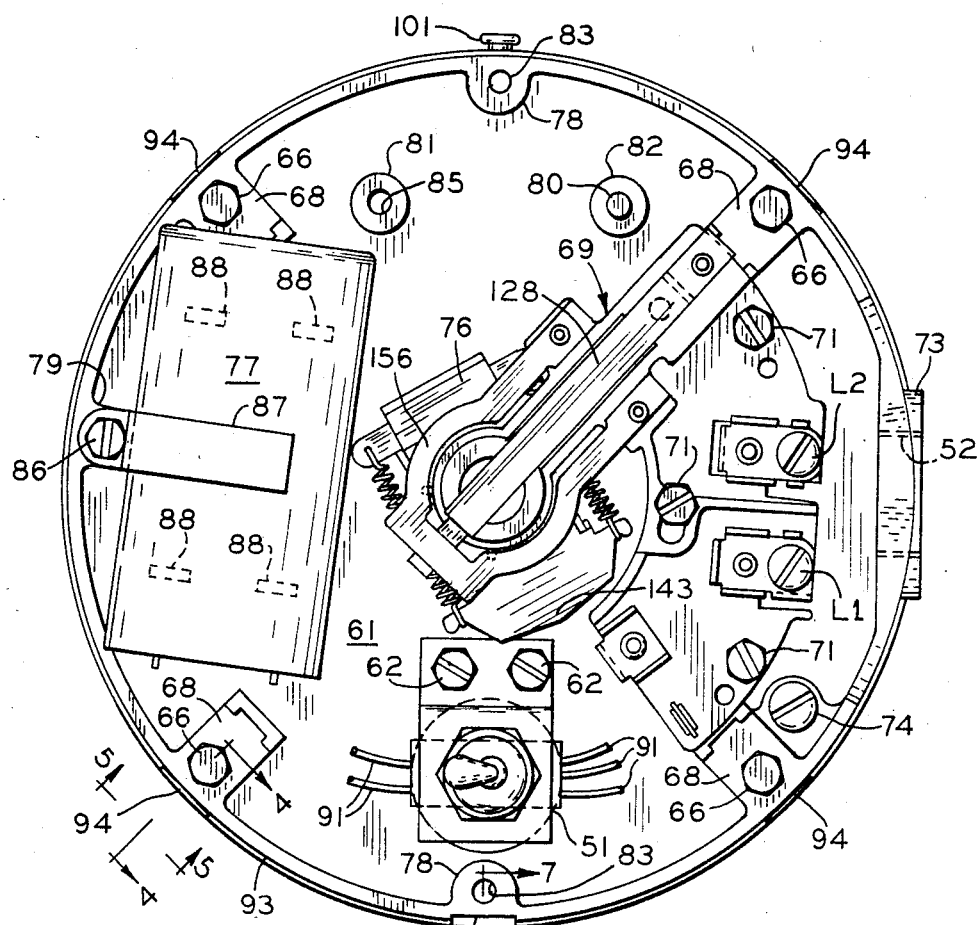
FIG. 3 is a plan view of the motor shown in FIG. 1, with parts removed therefrom.

With reference now to the drawings and with particular reference to FIGS. 1 and 2, the structure shown will be described with particular emphasis being placed upon the new and useful features and parts.

FIG. 1 illustrates a motor 40 arranged in what is commonly referred to as a vertical shaft down position. As will be understood, the shaft 41 projecting from the motor will be coupled with a pump impeller or any other load that is to be driven by the motor. The motor 40 includes the shell 42 having upper vent holes 43 therein, an upper end frame which is hidden from view in FIG. 1 by a rain or drip shroud 44, and a lower end frame 46. The lower end frame includes a number of internally threaded bosses 47 by means of which the motor 40 may be assembled with a pump assembly.

Also visible in FIG. 1 is a novel switch compartment cover 48 which is fastened to the upper end frame by means of a pair of axially oriented screw fasteners 49, an electrical conduit fitting 51 threaded into a tapped hole 52 (see FIG. 2) of the upper end frame, and a winding energization control switch boot 53 (best seen in FIG. 31).

The rain shroud 44 is held in assembled relationship as part of the complete motor 40 by means of the cover 48, all as will be explained in more detail. Thus, separate fastening means are not required for holding the rain shroud on the motor. Moreover, for applications where a rain shroud is neither needed nor desired, the shroud simply can be dispensed with and in such an event, a motor arrangement as shown in FIG. 2 will result where the rain shroud has in fact been dispensed with.

Referring now to FIG. 2, the motor 54 shown is substantially the same as the motor 40, with the exception that it is a single speed rather than a two speed motor, it does not include a rain shroud, and a speed or energization selection switch 53 is not included. Because of this, the cover 56 is slightly different from the cover 48 in that no provision is made for a switch which would protrude therefrom. Such a switch may be provided when the motor is to be operable at two differnet speeds, or when it is desired to have a line disconnecting switch at the motor.

A manually operable switch, in the form of a toggle switch, is shown at 57 in FIGS. 3 and 31 where it will be seen that the switch is trapped by means of a pair of nuts 58 on a switch bracket 59 which in turn is fastened to the end frame 61 by means of a pair of self tapping screws 62. The bracket 59 is dimensioned so that when the cover 48 is placed on the motor 40, the recessed surface 63 will fit about exposed threads on the switch body. The rubber boot 53, having a threaded nut molded therein, then is threaded onto the switch to provide a waterproof arrangement.

With reference now to FIG. 3, the aluminum die cast end frame 61 (as is the case also with the end frame 64 shown in FIG. 2) is fastened to the opposite end frame by means of clamp bolts 66 which pass through holes 67 (see FIG. 4) that are provided in reinforcing bosses 68 which are molded as unitary parts of the end frame.

Also revealed in FIG. 3 is a two speed switch assembly generally denoted by the reference numeral 69 which is mounted to the end frame by means of three self tapping screws 71. The switch portion of the switch assembly 69 is illustrated in detail in FIGS. 23-26 and a detailed discussion of such assembly will be provided in conjunction with a discussion of such figures. The terminal block portion of the switch assembly 69, on the other hand, is essentially the same as the terminal block portion of the single speed switch assembly 72 illustrated in detail in FIGS. 16-19, 29, and 30. Because of this, a description of the terminal block and mounting portion of the switch assembly 69 will be described in detail in conjunction with the terminal block portion of the switch assembly 72.

FIG. 3 further reveals the conduit fitting mounting leg 73, grounding screw 74, centrifugal switch actuating or operating mechanism 76, a start capacitor 77, and a pair of cast bosses 78, and cast bosses 79, 81, and 82. The bosses 78 surround tapped holes 83 which accommodate axially directed screw fasteners that are used to secure the cover 48 to the end frame 61. The boss 79, on the other hand, has a hole therein in which a self tapping screw 86 may be fastened to hold a capacitor clamp 87 in place, which of course holds the capacitor 77 in place on the end frame. Underlying the capacitor 77 and holding the capacitor in spaced relation to the end shield are four cast bosses or capacitor standoff legs 88, two of which may be best seen in FIG. 2.

At this point, it should be noted that, although the end shields 61 and 74 are different, due to the provision of holes which are used to mount a manually operable switch, the end shields are otherwise identical, and thus like reference numerals have been used to denote like parts and portions of such end frames. Furthermore, in order to simplify the drawings and avoid confusion, lead wires and jumper leads have not been shown in any of the views. However, persons skilled in the art will understand that lead wires 91 and appropriate jumper wires interconnect the capacitor 77, terminals on the terminal block portion of the switch assembly, and thermal protectors, such as the protector 92 (see FIG. 2)—assuming such a protector is provided. Thus such wires are appropriately interconnected before the cover 48 or cover 46 is placed on the motor. The appropriate connection of such wires and jumpers will be apparent from FIGS. 27 and 28, and will be described below in conjunction with a discussion of the FIG. 27 and FIG. 28 wiring diagrams.

Figure 15:
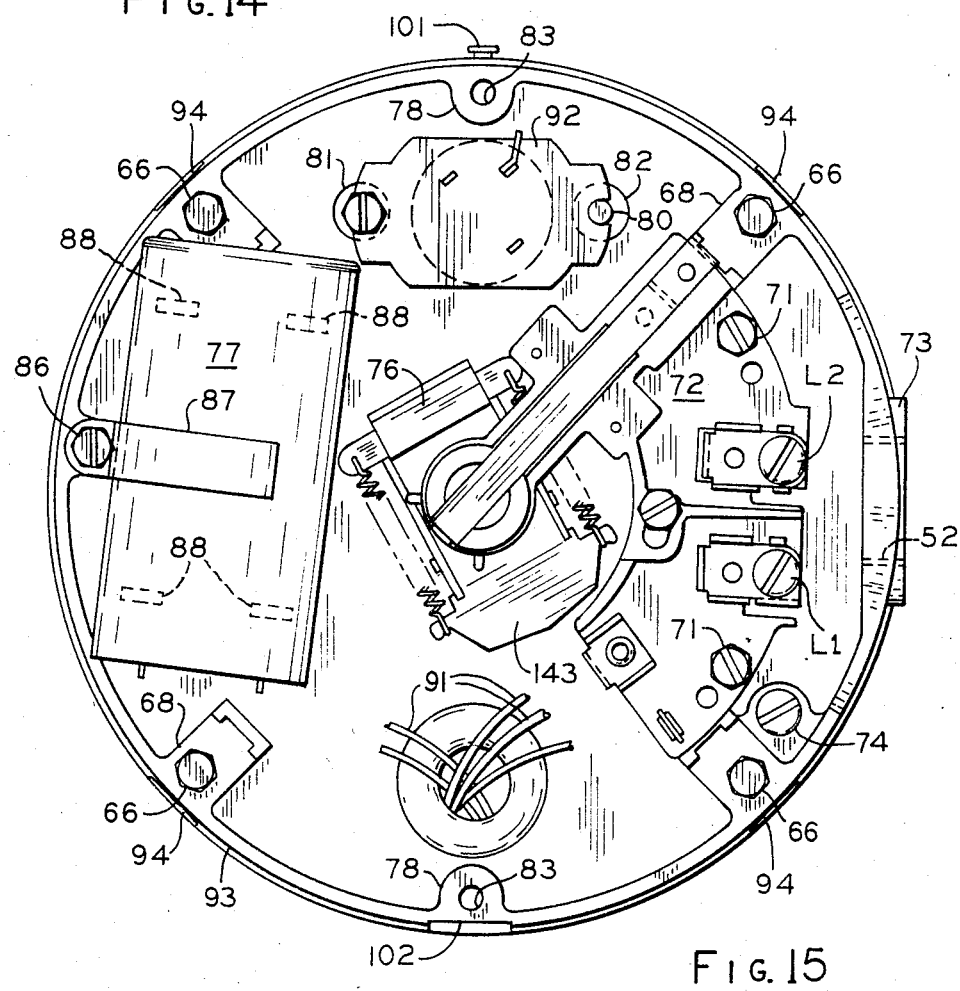
FIG. 15 is an end view looking into the end of the motor shown in FIG. 14.

Continuing now with a description of FIG. 3, it will be noted that the boss 81 is provided with a centrally located hole while the boss 82 is provided with a centrally located pin 80 projecting upwardly therefrom as viewed in FIG. 3. The use and function of the bosses 81 and 82 in conjunction with mounting the thermal protector 92 of FIG. 2 will be best appreciated by also considering FIG. 15. Thus, one ear of a protector 92 is caught on pin 80, while the other ear of the protector is fastened to boss 81 by means of a self-tapping screw which is threaded into the hole 85 which is cast in the boss 81. By this means, the protector 92 may be positively mounted quickly and yet with a single mounting screw.

Considering together FIGS. 3-8 and FIGS. 9-13, the interrelationship of the shroud 44, end shield 61, cover 48, and motor shell 42 will be described in detail. With reference first to FIG. 13, it will be understood that the end shield 61 includes a rabbet surface 93 along which the cover 48 fits. Also formed in the end shield are a number of notches generally denoted by the reference numeral 94 which accommodate tabs 96 (see FIG. 9) formed on the shroud 44. Thus, in order to assemble the shroud with the motor, the shroud is slipped along the rabbet surface of the end shield 61 so that the tabs 96 thereon are received in the notches 94. Subsequent assembly of the plastic cover 48 traps and holds the shroud 44 in place.

It will be seen from FIG. 9 that four tabs 96 are provided on the shroud 44. However, the number of tabs provided is not critical, so long as a sufficient number are provided to securely hold the shroud in place and prevent it from being inadvertently separated or torn from a motor to which it is attached.

Preferably, the shroud is molded from any suitable engineering plastic material. In actual reductions to practice of the invention, Noryl ® HS2000 phenylene oxide resin purchased from the General Electric Company was used for molding the shroud 44.

FIG. 10 represents a "typical" cross-section of the shroud 44. However, in order to provide added strength and rigidity to the shroud, a number of ribs 96 (see FIG. 12) are molded into the shroud at a number of spaced apart locations. It also will be noted that two notches are provided in the shroud, the first one being generally identified at 98 to provide clearance for the conduit leg portion of the end shield, and a second notch 99 (see FIG. 11) is provided to accommodate an oil filler tube plug 101 carried by the end frame (see FIGS. 2 and 3).

Figure 4:
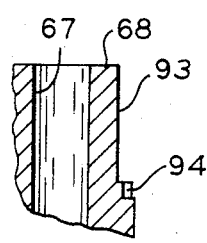
FIG. 4 is a cross-sectional view, with parts removed, looking in the direction of arrows 4—4 in FIG. 3.
Figure 5:
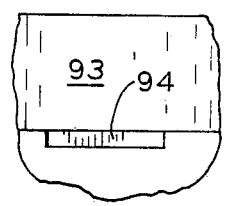
FIG. 5 is a fragment of a view looking in the direction of arrows 5—5 in FIG. 3.

FIGS. 4 and 5 reveal that the notches 94 are relatively small. For example, suitable results have been obtained when the notches were approximately 0.375 inches wide (measured across FIG. 5) and about 0.060 inches deep (measured across FIG. 4).

Figure 7:
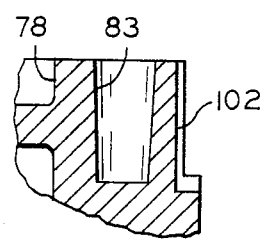
FIG. 7 is a cross-sectional view, with parts removed and parts broken away, looking in the direction of arrows 7—7 in FIG. 3.
Figure 6:
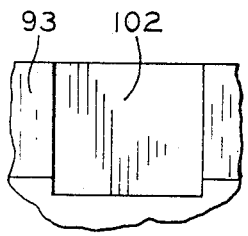
FIG. 6 is a view fragment looking in the direction of arrows 6—6 in FIG. 3.
Figure 8:
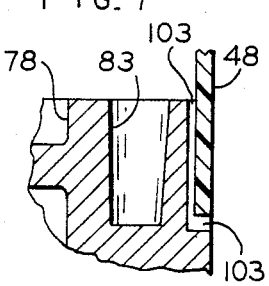
FIG. 8 is a view corresponding to FIG. 7 except that it shows the compartment cover in place on the motor end frame.

An additional notch 102 will also be noted in the rabbet surface 93 (see FIGS. 3 and 6). The notch 102 is wider than the notches 94 and has been made, in actual reductions to practice, to be approximately 0.500 inches wide (across FIG. 6) and approximately 0.035 inches deep. Moreover, this notch is located as shown in FIGS. 7 and 8 so that when a cover 48 or 56 is positioned on the end frame, a labyrinth drain passage 103 will be defined between the machined surface of the end shield and the switch compartment cover. This labyrinth drain passage is of particular value and use for horizontal shaft applications. In such applications, the motor is relatively positioned, as shown for example in FIG. 3, with the oil well filler cap 101 at the top of the motor and the drain notch 102 located at the bottom of the motor. With this arrangement, any moisture that might condense or otherwise occur inside the switch compartment will be able to readily drain out of the motor and yet the passageway will be sufficiently small to inhibit entry of insects.

The covers 48 and 56 preferably are molded plastic for reasons of simplicity, economy, corrosion resistance, general durability, and electrical isolation. Although substantially any desired engineering plastic material may be used, preferred embodiments have utilized Noryl ® HS2000 thermoplastic material purchased from General Electric Company in making the covers 48 and 56.

With reference now to FIGS. 15-19, mounting of the switch assemblies 72 and 69 will be explained. It will be noted from FIGS. 17 and 19 that the die cast aluminum end frames have two mounting posts 104, 106 cast therein as well as a standoff post 105. As will be best appreciated from a review of FIGS. 18, 29, 17, and 19, the terminal board portion of the switch assembly 72 is provided with a multiple mounting surface design and thus mounting surfaces 107 or 108 may be positioned on top of the mounting posts 104, 106, and post 105. In the case of FIG. 17, mounting surfaces 107 are resting on the top of the posts 104 and standoff. On the other hand, in the case of FIG. 19, mounting surfaces 108 are resting on the top of the posts and standoff. With an arrangement such as that illustrated, it is possible to vary the height of the switch assembly above the top of the end frame as viewed in FIGS. 17 and 19. This is desirable for reasons that are explained hereinbelow. For the moment however, it is sufficient to note that assembly of a switch assembly 69 or 72 with an end frame can be readily accomplished with the assembly at different predetermined heights above the end shield in different motors simply by choosing to use mounting holes 110 (in which case surfaces 108 will rest upon end shield supporting surfaces) or by using mounting holes 111 (in which case surfaces 107 will rest upon end shield supporting surfaces).

The provision of an elongated slot 109 facilitates assembly, and whereas relatively short screws 71 are shown fastening the switch assemblies to the mounting posts 104, 106, a relatively longer screw 100 is threaded into the end frame.

The variable level or height mounting just described may be accomplished to vary the height of the switch assembly 69 or 72, above the end frame without having any affect on the interaction between the switch operating mechanism and the switch assemblies 69, 72. The reason for this is that the holes 110, 111 are located along an arc of a circle having its center at the centers of the switch contacts which are essentially co-incident with the point 113 along which acutating forces are applied to the switch assembly. Similarly, the slot 109 has its center located along a circle that is concentric with the arc defined by the centers of holes 110 and 111. Of course, the mounting posts or bosses 104, 106, and the holes therein lie along an arc congruent with the arc that locates the centers of holes 110 and 111.

While two discrete steps have been illustrated such that mounting surfaces 107, 108 result, it should be understood that three or more surfaces could be provided to provide either a greater overall range of mounting height adjustments or "finer" graduated adjustments. Moreover, while discrete steps have been shown and are preferred for providing variable height mounting surfaces, it should be undertood that one could provide a smooth inclined plane mounting surface (along with slots rather than discrete holes 110, 111) so that infinitely variable mounting heights could be provided within the range of heights afforded by the two ends of such inclined plane mounting surfaces.

Before leaving FIGS. 16-19, it is further noted that the various terminals 116 and line terminals L1 and L2 are formed from conventional electrical brass material. On the other hand, the molded portions of the switch assembly and terminal board which will now be described in even more detail, are preferably formed from any suitable engineering plastic. In preferred forms, the switch assemblies illustrated and described herein have been formed from Valox ® 420 thermoplastic material purchased from the General Electric Company.

The molded portions of the switch assemblies and terminal boards 69, 72 are virtually identical. Moreover, all of the parts utilized in the switch assembly 72 (now to be described in detail) are also present in the switch assembly 69 except for the fact that one of the switch arms in the switch assembly 69 is elongated as compared to its corresponding arm in the assembly 72.

It will be appreciated from a review of FIGS. 16 and 17, that the switch assembly 72 includes a terminal board portion which includes the mounting surfaces previously described, an electrical isolation wall 117 separating the terminals L1 and L2, and a reinforcing and protecting wall 118. Also included is a switch arm mounting section which is best viewed in the upper portion of FIG. 16 and which portion further includes a switch actuator retaining means. The arrangement of these means will be better appreciated by referring to FIGS. 20–22 wherein 119 generally denotes the switch arm supporting section and the reference numeral 121 is used to denote a bore defining distal portion which functions as an actuator retainer means and is illustrated in the form of a barrel.

Figure 20:
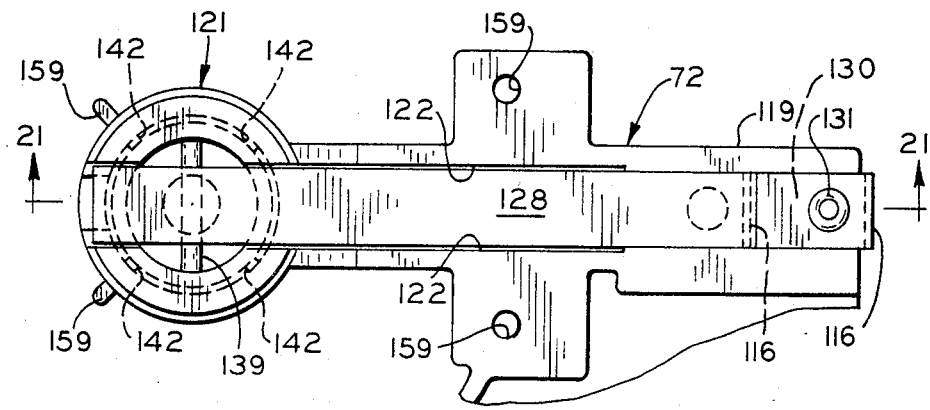
FIG. 20 is an enlarged view of a portion of the switch shown in FIGS. 16 and 17.
Figure 21:
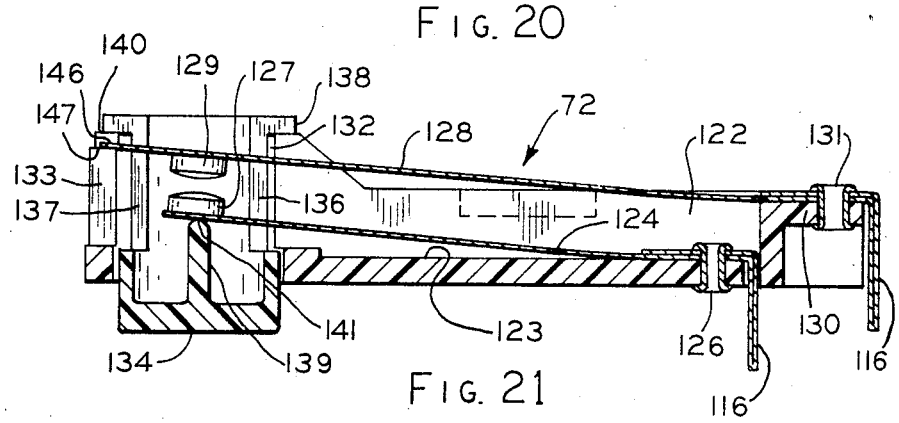
FIG. 21 is a cross-sectioonal view taken in the direction of arrows 21—21 in FIG. 20.

Comparing FIGS. 20 and 21 for a moment, it will be seen that the supporting section 119 includes a channel defined between a pair of walls 122 and a floor 123. Moreover, disposed within such channel is a switch arm 124 which is fastened to the floor of the channel by means of a rivet 126. The end of arm 124 is folded back upon itself as illustrated, and the extending double thickness portion thereof forms a spade terminal 116 for connection to a female connector. As will be seen from FIG. 21 the arm 124 carries a switch contact 127. Overlying the switch arm 124 and within at least part of the previously mentioned channel is a second switch arm 128 which carries a contact 129 at one location and which is folded upon itself to form a spade terminal 116, and fastened to the switch arm supporting section by a rivet 131. Since the connection of the switch arms, rivets, and molded substrates to one another by means of a rivet approach is known in the art, further discussion of such connections is not presented herein.

Figures 14, 32:
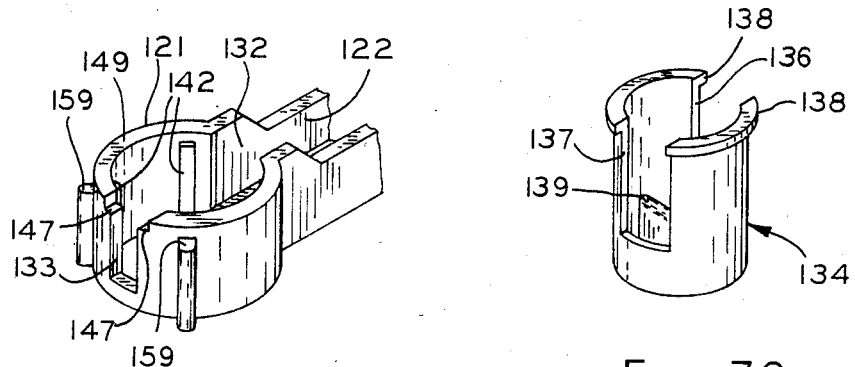
FIG. 14 is an enlarged perspective view, with parts broken away, of part of the molded portion of the switch assemblies shown in FIGS. 2, 3, and 15.
FIG. 32 is an enlarged perspective view of the switch actuator or plunger that forms part of the switch assemblies shown in FIGS. 15—28.

A perspective detail of the barrel 121 is presented in FIG. 14 and it will be noted that the barrel includes front and rear slots 132, 133. With the switch arms shown in FIGS. 20–22, it will be appreciated that both of these arms project along the slot 132. Disposed within the barrel 121 is an actuator 134 which is best shown in FIG. 32. The acutator 134 includes front and rear slots 136, 137 respectively, two upper flanges 138, and a force transmitting centrally disposed actuating rib or switch arm driver 139.

Figure 22:
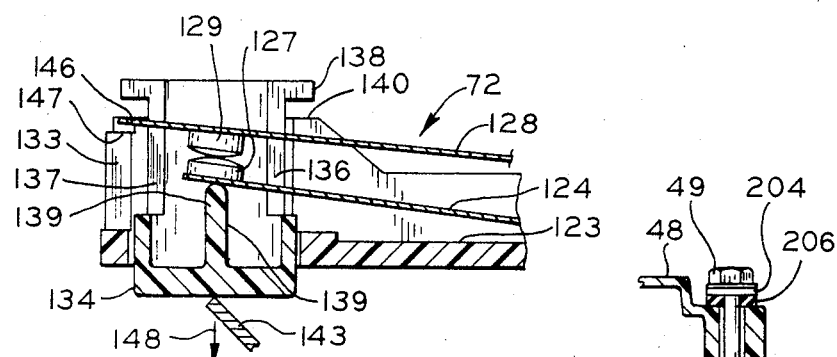
FIG. 22 is a view of a portion of the structure shown in FIG. 21 but with the switch arms and contacts in a different position due to actuation of the switch plunger or actuator.

As best revealed in FIG. 22, the actuator serves as a plunger having a relatively thick in cross-section (for wear purposes) bottom reaction wall that coacts with a switch mechanism, and side wall portions that are somewhat less thick in cross-section. As will be appreciated from FIGS. 20–22, the molded actuator and switch arm support jointly establish a maximum open contact gap between the contacts 127, 129.

When assembling the switch assembly 72, an actuator 134 is disposed in the barrel 121 and the slots 136, 137 (of the actuator) are aligned with the slots 132, 133 of the barrel 121. Thereafter, the contact and switch blade 124 are positioned in the channel defined by walls 122 and the switch arm 124 is permanently secured to the floor 123 with the rivet 126. When this is accomplished, the tension on the normally flat switch arm 124 holds the actuator 134 in place in the barrel 121.

With reference to FIG. 21, it will be noted that the difference in height between the floor 124 and the top edge or surface 141 of the rib 139 will determine the amount of preload that is placed upon the switch arm 124. This preferably is considered since the switch arm 124 provides the restoring force to the actuator during switch operation. After the actuator, switch arm 124 and rivet 126 have all been assembled with the switch supporting section 119, the second or upper switch arm 128 is positioned along the slots 132, 133 of the barrel 121 and rivet 131 is used to attach the upper switch arm 128 to the switch arm supporting section 119. An abutment surface 117 locates the free end of arm 128 so as to preload this arm. The amount of such preload is determined as will be understood, by the mold cavity dimensions which determine the relative locations of surface 147 and the surface 130.

It will be noted that rib guides 142, which act as spacers, are molded to project from the axially extending interior surface of barrel 121. The outer surface of actuator 134 rides along these ribs and the space thus provided between the outer surface of actuator 134 and most of the interior walls of barrel 121 helps assure that dust, dirt, or other debris will not cause sticking of the plunger or actuator 134 within barrel 121 and thus disturb reliable and consistent switch operation.

When the motor 54 (see FIG. 2) is not running, the conventional centrifugal mechanism 76 (see FIG. 15) will be positioned so that the actuating tongue 143 thereof (see FIG. 22) biases the actuator 134 upwardly as best shown in FIG. 22. In this condition, the contacts 127 and 129 are engaged with one another and power thus would be supplied to an auxiliary or starting winding when it is applied across line terminals L1 and L2 of the switch assembly 72. It will be noted that when the switch arms 128, 124 are in the deflected positions thereof shown in FIG. 2, there is a force exerted from both of such arms downwardly against the acutator rib 139. Moreover, it will be noted that when the switch arm 128 is in the position illustrated in FIG. 22, a distal portion 146 thereof is spaced from a blade stopping surface 147 that is formed as part of the barrel 121. Then, when the motor 54 is energized, as it comes up to speed, the centrifugal mechanism 76 will, with a snap action, pull the tongue 143 downwardly in the direction of arrow 148 (see FIG. 22) a distance sufficient that actuator 134 will not contact tongue 143 even when the flange 138 of the actuator is resting on the upper surface 149 of the barrel 121.

During motor operation, as the tongue 143 (see FIG. 22) snaps downwardly, the switch arms 124 and 128 immediately snap the actuator 134 downwardly. However, as the actuator 134 and switch arms 124, 128 are moving, portion 146 of switch arm 128 impacts the switch arm stopping surface 147 and the contact 127 carried by switch arm 124 thereupon separates from the contact 129 so that they attain their relative positions thereof as viewed in FIG. 21.

It is desirable that plunger 134 and contact 127 travel as far as possible during a switch breaking action since the tension or spring force tending to aid breaking is a function of and proportional to the amount of deflection of arm 124. Such deflection, in turn, is a function of and proportional to the amount of travel of plunger 134. It will be appreciated that tongue 143 undergoes only a finite amount of travel for any given switch operating mechanism. However, with switches designed as shown herein, maximum utilization of the travel of the switch operating mechanism is attained. Thus, the travel of plunger 134 can be, if desired, 100% of the travel of tongue 143. This desirable result occurs because the movements of contacts 127, 129, plunger 134, and tongue 143 are essentially collinear.

Figure 27:
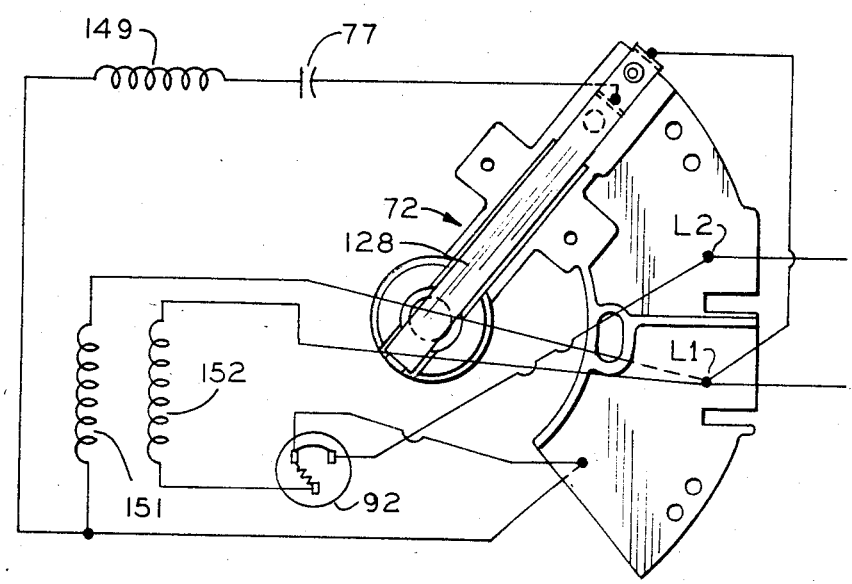
FIG. 27 is a connection diagram for motors utilizing the switching arrangement shown in FIGS. 15 and 16.

With reference now to the connection diagram illustrated in FIG. 27, the auxiliary winding 149 and main windings 151, 152 of motor 42 are normally not energized when power is not supplied to line terminals L1 and L2. However, at that instant in time, switch arms 128 and 124 of the switch assembly 72 are positioned so that the contacts thereof are closed. Thus, as soon as power is supplied to line terminals L1, L2, power will be supplied to the auxiliary winding 149 thorough capacitor 77 and to both main windings 151, 152. Subsequently, when power is supplied to line terminals L1, L2, the motor 54 will start, come up to speed, and the centrifugal switch actuating mechanism will cause the actuator 134 to move so that the contacts carried on contact arms 124, 128 will separate, thus breaking the supply of power to the auxiliary winding 149. However, main winding sections 151, 152 will continue to receive power through the thermal protector 92 and the motor will continue to run. Later, when the motor is de-energized, the centrifugal mechanism will reset and the tongue 143 thereof will once again close the switch in switch assembly 72.

It should be understood that the capacitor 77 has been shown in the wiring diagram of FIG. 27 and in other views in the drawings herein for purposes of illustration. However, it should be understood that the switch assembly 72 and switch assembly 96 may be used with types of motors that do not utilize start capacitors such as, for example, resistance split phase motors.

With reference now to FIGS. 23–26, it is noted that the molded portions of the switch assembly 69 there shown are identical to the molded portions of the switch assembly 72 shown in FIGS. 20–22 and the relative movement and operation of such parts are also identical. However, in the switch assembly 69, the lower or first switch arm 153 is longer than the switch arm 124 of switch assembly 72. Moreover, the lower switch arm 153 carries not only a first contact 127, which is arranged to engage contact 129 on switch arm 128, but lower switch arm 153 also carries a second contact 154. The extended portion of switch arm 153 passes along the notches or slots 137 and 133 previously described. Thus, as was the case also with the switch arms in the switch assembly 72, the parallel alignment of the switch arms 153 and 128 in the switch assembly 69 are maintained by means of the channel established by the walls 122 as well as due to the fact that the switch arms pass along and are confined by the notches 136, 137 of the actuator 134.

The switch assembly 69 further differs from the switch assembly 72 in that a bifurcated third switch arm structure 156, carrying a contact 157 is provided. The two legs of switch arm 156 straddle the other two arms and are attached to the switch arm supporting section 119 by means of rivets 158 which pass through the holes 159 in the supporting section 119. The rivets 158 may also fasten a terminal (not visible in FIG. 23) to the supporting section for connection to a lead wire. Alternatively, such wire may be welded or soldered directly to the end of the arm.

Attention is now directed to FIGS. 20 and 32 and the abutment posts 159 that are molded as part of the barrel 121. These abutment posts or ears serve as stops for the switch arm 156 and limit downward travel of switch arm 156 when the actuator 134 moves downwardly to the "open switch" position thereof. Operation of the switch assembly 69, upon movement of the switch mechanism tongue 143 (see FIG. 26) is the same as described in conjunction with the operation of switch assembly 72. Thus, with reference first to FIG. 26, prior to the time the motor 40 is energized, both pairs of contacts 127, 129 and 154, 157 are closed. However, when the motor is energized and as it comes up to speed, the mechanism tongue 143 snaps downwardly in the direction of arrow 148 as viewed in FIG. 26, with the result that the actuator 134 snaps through the position shown in FIG. 25 to the open switch position shown in FIG. 24. With the arrangement illustrated in FIGS. 23–26, the switch arm 156 contacts the abutment post 159 so that contacts 154 and 157 separate from one another with a weld breaking action and thereupon the distal or end portion 146 of the contact arm 128 contacts the blade stopping surface 147 of the barrel 121 whereupon further movement of the switch arm 128 is arrested and contacts 127 and 129 separate with a weld breaking action. This same action also occurs with the structure shown in FIGS. 20–22.

Figure 28:
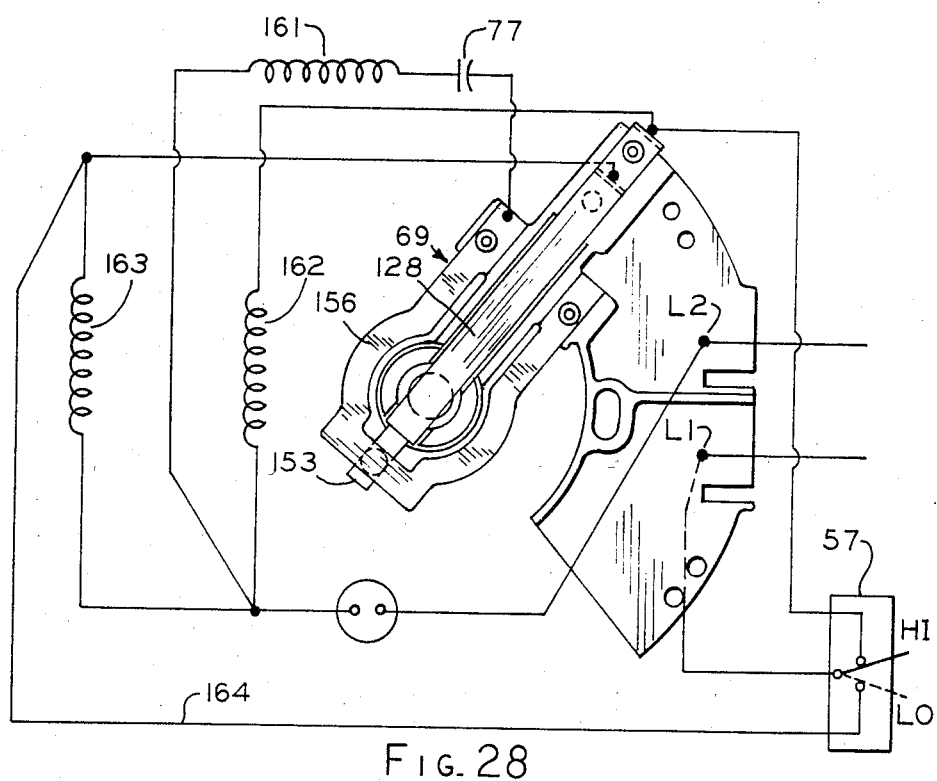
FIG. 28 is a connection diagram for motors using the switching arrangement shown in FIGS. 3 and 23.

With reference now to FIG. 28, a connection diagram for the switch assembly 69 in conjunction with motor 40 will be described. In this case, the motor 40 is a two speed motor capable of operation either at two pole speed (3450 rpm) or four pole speed (1725 rpm). In FIG. 28, the two pole start winding 161 is connected to the switch arm 156 while the two pole main winding 162 is connected to the switch arm 128, whereas one side of the four pole main winding 163 is connected to lowermost, first switch arm 153. The other side of all three windings 161, 162, and 163 are connected through a thermal protector, embedded in the winding end turns, to line terminal L2 and thus to one side of the line when line power is supplied to terminals L1 and L2.

Figure 24:
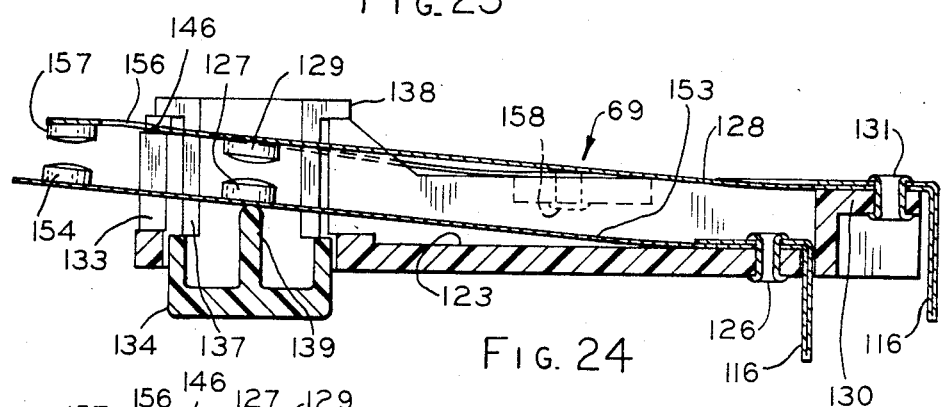
FIG. 24 is a cross-sectional view taken in the direction of arrows 24—24 in FIG. 23.
Figure 25:
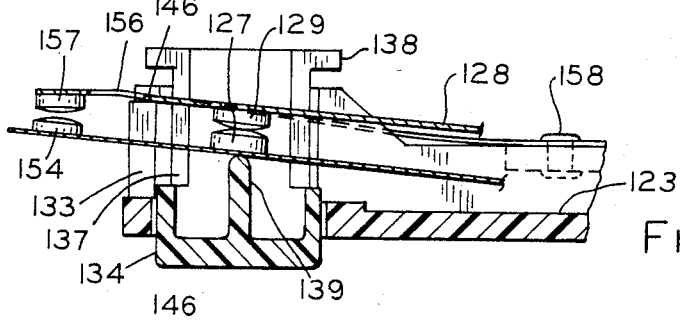
FIG. 25 is a view showing a portion of the mechanism of FIG. 24 with the switch actuator in an intermediate actuating position.
Figure 26:
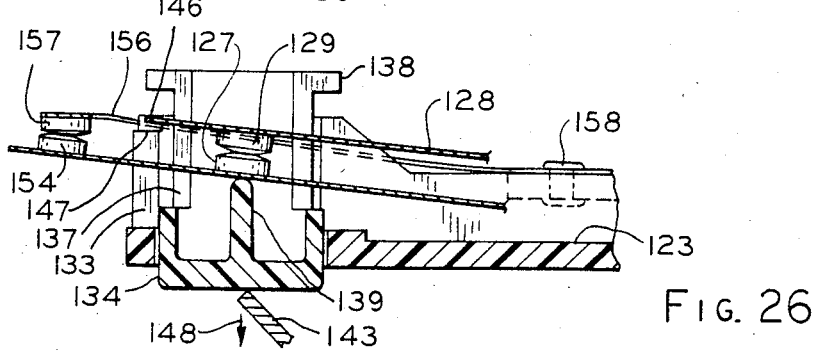
FIG. 26 is a view of the same structure shown in FIG. 25 but wherein the switch actuator has travelled further so that two pairs of contacts have been closed.

The four pole main winding 163 (which is connected to the switch arm 153) is also connected, through a line 164, to the low speed terminal of the toggle switch 57. The high speed terminal of the toggle switch 57 on the other hand is connected to the same blade terminal as the end of the two pole main winding 162—i.e., the terminal connected to switch arm 128. For high speed operation, the toggle switch will be in the solid line position illustrated in FIG. 28. Thus, when power is supplied to the line, line L1 is connected through the movable contactor of the toggle switch 57 to the contact blade 128. At this instant in time, two pairs of contacts of the switch assembly 69 are closed as shown in FIG. 26. Thus, power will be supplied at that instant to all three of the windings 161, 162, and 163. However, as the motor comes up to speed, both contact pairs open as represented in FIG. 24 with the result that neither the two pole auxiliary winding nor the four pole main winding are supplied power from the switch arm 128. Thus, the motor 40 will have only the two pole main winding 162 energized and it will operate at high speed.

When the toggle switch 57 is switched to the low speed configuration, as represented by dashed lines in FIG. 28, power is supplied to line terminal L1 and thence through line 164 to the four pole main winding 163 as well as to the switch arm 153. Since the condition of the switch assembly 69 at starting is as shown in FIG. 26, power thus will be supplied from line L1 through the switch arm 153 and contact pairs shown in FIG. 26 through the switch arms 128 and 156 to both the two pole auxiliary winding and the two pole main winding. Thus, for low speed operation the motor will start as a two pole high speed motor. However, as the motor comes up to speed, the contact pairs separate and the switch assembly 69 is in the configuration as illustrated in FIG. 24. At this time the three switch arms 128, 153, and 156 are electrically isolated from one another so that the two pole auxiliary winding and two pole main winding are no longer energized. Thus, the motor 40 will continue to run as a four pole, low speed motor.

Figure 33:
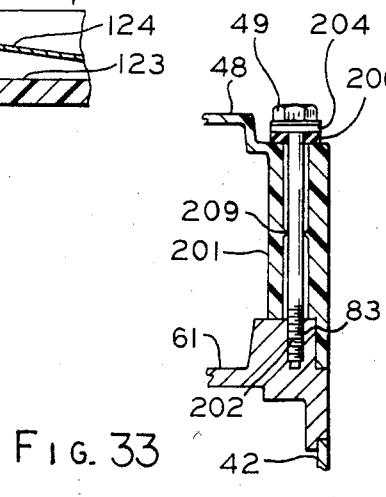
FIG. 33 is a cross-sectional view through part of the motor cover showing a fastening scheme employed in preferred embodiments of the invention.
Figure 23:
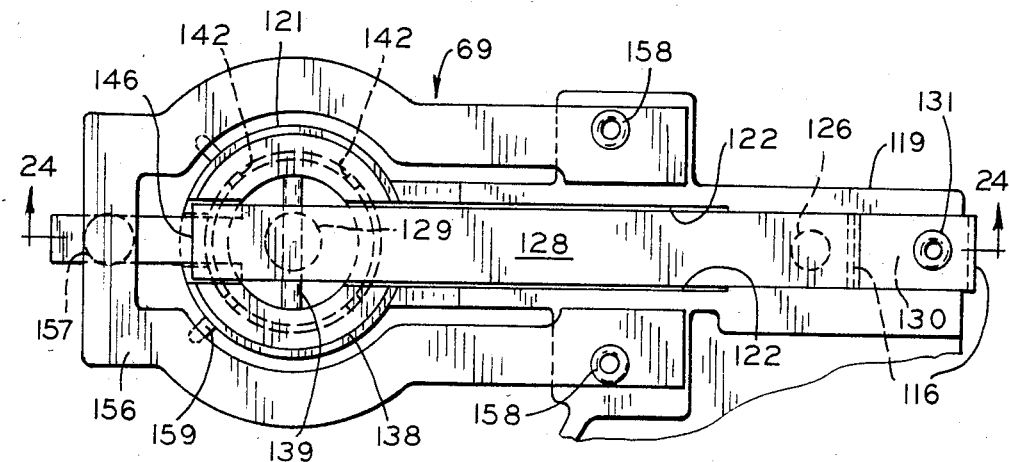
FIG. 23 is an enlarged view of a portion of the switch mechanism shown in FIG. 3.

With reference now to FIG. 33, the mode of attaching covers 48 and 56 to the motors 40 and 54 will be described. It is believed that, heretofore, covers have been made of metallic material and fastened with radially directed screws. The arrangements shown herein, however, utilize axially directed screws which is more convenient in the field. Moreover, enlarged posts 201 resist the collapsing force resulting from tightening the screws 49. As will be seen from FIG. 33, provision is made to prevent the cover from being cracked or otherwise damaged by screw 49. Thus, the tapped hole 202 in the end frame is dimensioned so that screw 49 will bottom out therein. The screw 49 and cover 48 are in turn dimensioned so that the head of the screw and common steel washer 204, when considered alone, would not apply any compressive force on the cover even when the screw is bottomed in hole 202. However, limited, nondamaging compressive force, coupled with a water sealing effect is provided by a compression washer 206 trapped between the steel washer 204 and the cover 48, any suitable compression washer or elastomeric material may be used, and in an actual reduction to practice of the invention, 50 durometer rubber having a nominal uncompressed thickness of 0.100 of an inch was used. The dimensions of the hole 202, cover 48, screw 49, and washer 204 were such that the washer 206 was compressed to a thickness of about 0.045 of an inch; with the screw 49 being dimensioned to a tolerance of plus or minus 0.010 of an inch.

In this manner, the plastic covers are protected from damage caused by overtightening of screws 48 and a water repelling seal about the screws is provided by a single means—i.e., the compression washer.

Study of FIG. 33 will also reveal detents 209 molded in the internal diameter of hole 202. When the screw 49 is placed in hole 202, it can be threaded past detents 209. However, when the cover 48 is removed in the field, the detents prevent screws 48 from falling out of the cover.

It should now be understood that I have described and shown numerous preferred embodiments of new and novel motor constructions and operating techniques. Moreover, new and improved methods of assembling and adjusting switch assemblies have been described as well as new and improved methods of assembling novel switch assembly components.

Accordingly, while I have now shown and described preferred and alternate forms of motors and assemblies therefor, as well as methods pertaining thereto, the disclosure contained herein should be construed as being exemplary, and the invention itself should be limited only by the scope of the claims that are appended hereto and that form part of this disclosure.

I claim:

1. In an electric motor winding energization controlling switch assembly comprising a switch arm support, at least two elongate switch arms supported thereon, and at least one contact carried by each of said switch arms, the improvement wherein: said support includes an elongate channel, for accommodating and protecting at least one of said switch arms and further includes an open barrel retainer at one end thereof for receiving a switch actuator; at least one of said switch arms is nested within said elongate channel; the switch arm support includes a switch arm stop surface; one of said switch arms is supported for movement into engagement with said stop surface; the assembly includes a cup shaped actuator disposed within said open barrel retainer; and said actuator has means for maintaining at least two of said switch arms in parallel alignment with one another.

2. The invention of claim 1 wherein said actuator includes a switch arm driver for engaging and deflecting at least one of said switch arms.

3. The invention of claim 2 wherein the actuator comprises a plunger having at least one sidewll portion and a reaction wall for coacting with a switch operating mechanism; said reaction wall being thicker in cross-section than said at least one sidewall portion.

4. The invention of claim 1 wherein the actuator includes a flange; and the flange, at least one of the switch arms, and the support interact to retain the actuator within said retainer.

5. The invention of claim 4 wherein the actuator is a molded part, and the dimensions of the actuator and switch arm support establish a maximum open contact gap between the contacts carried by the at least two switch arms.

6. The invention of claim 1 wherein the molded switch arm support includes means for mounting the support at different elevations with respect to a mounting of the surface motor.

7. The invention of claim 6 wherein the molded switch arm support includes a terminal block portion, and said means for mounting are disposed on the terminal block portion.

8. The invention of claim 1 wherein the switch arm support and actuator are molded synthetic material structures.

9. In an electric motor winding energization controlling switch assembly comprising a switch arm support, at least two elongate switch arms supported thereon, and at least one contact carried by each of said switch arms, the improvement wherein: said support includes an elongate channel for accommodating and protecting at least one of said switch arms; at least one of said switch arms is nested within said elongate channel; said support includes a switch arm stop surface and a switch actuator retainer; one of said switch arms is supported for movement into engagement with said stop surface; the assembly includes an actuator disposed within said retainer; said actuator has means for maintaining the at least two switch arms in parallel alignment with one another; said retainer defines an opening within which said actuator is accommodated; and wherein at least one of the facing surfaces of the retainer and actuator is provided with rib means for preventing broad based surface to surface sliding contact along said opening and between said actuator and retainer.

10. The invention of claim 9 wherein the switch arm support includes abutment surface means and switch arm mounting areas so that at least one additional switch arm may be held thereby.

11. The invention of claim 10 wherein the assembly includes a third switch arm having a contact thereon and carried by the blade support; the actuator includes a driver that directly engages one of the switch arms; wherein the switch arm engageable by the switch arm driver includes two spaced apart contacts, a first one of which is aligned and engageable with a contact on a second switch arm, and the second of which is aligned and engageable with a contact on the third switch arm; and the switch arm support includes means for limiting movement of the third switch arm.

12. The invention of claim 11 wherein the third arm is a bifurcated member having a bight portion and two legs, and a contact is carried on the bight portion thereof, and wherein both legs of the third arm are fastened to the support, thereby to assure alignment of the contact on the third arm with the contact on the first arm, and wherein the actuator includes a guide notch which limits transverse movement of the second switch arm.

* * * * *